W. J. WRIGHT.
LUBRICATING DEVICE.
APPLICATION FILED SEPT. 21, 1911.
1,035,402.
Patented Aug. 13, 1912.
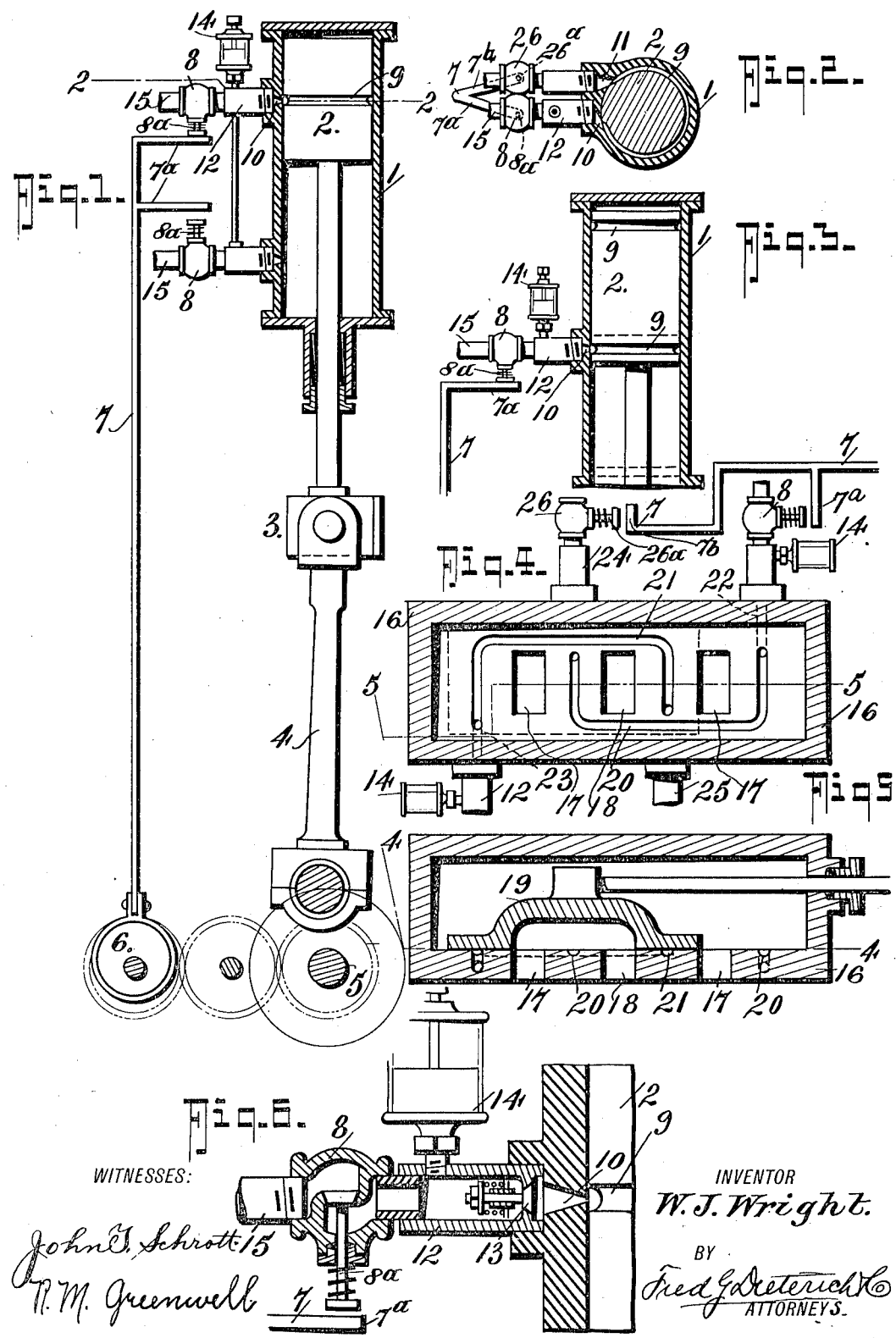

UNITED STATES PATENT OFFICE.

WILLIAM J. WRIGHT, OF FRANKLIN, PENNSYLVANIA.

LUBRICATING DEVICE.

1,035,402. Specification of Letters Patent. Patented Aug. 13, 1912.

Application filed September 21, 1911. Serial No. 650,569.

*To all whom it may concern:*

Be it known that I, WILLIAM J. WRIGHT, residing at Franklin, in the county of Venango and State of Pennsylvania, have invented certain new and useful Improvements in Lubricating Devices, of which the following is a specification.

My invention is an improved method and means for lubricating engine pistons, cylinders, valves and other relatively moving surfaces, and in its generic nature resides in providing one of the relatively movable parts with oil circulating grooves, pockets or channels, into which, at definite intervals, lubricant is injected to form a thread or stream to lubricate the moving parts, the excess lubricant being blown out or drained off during succeeding injections.

The system is particularly advantageous and adapted for use in connection with steam and gas engines, for lubricating their pistons and valves, and the invention also includes those novel details of construction, combination and arrangement of parts, all of which will be first fully described and then be specifically pointed out in the appended claims, reference being had to the accompanying drawing, in which:

Figure 1, is a diagrammatic section and part elevation illustrating one way of carrying out the invention to lubricate a piston and its cylinder. Fig. 2, is a cross section on the line 2—2 on Fig. 1. Fig. 3, is a detail view similar to Fig. 1 illustrating a modified way of applying the invention to lubricate pistons and cylinders. Fig. 4, is a cross section on the line 4—4 on Fig. 5, showing the invention applied as a lubricating means for slide valves. Fig. 5, is a horizontal section on the line 5—5 on Fig. 4. Fig. 6, is an enlarged detail section of a part of the invention.

In the drawings, in which like letters and numerals of reference indicate like parts in all of the figures, 1 represents the cylinder, 2 the piston, 3 the cross head, 4 the connecting rod, 5 the crank shaft and 6 the cam that operates the injector valve operating rod 7.

8 designates the inlet valves that control the admission of the injecting agent (compressed air, steam or exhaust, as the case may be). The valves 8 have stems 8ª which are engaged by the arms 7ª—7ª of the valve opening rod 7 hereinafter again referred to.

The piston 2 is provided with one or more part annular grooves 9 (see Figs. 1, 2 and 3) that extend nearly around the piston to form an oil channel.

12 designates an injector section that communicates through a back check valve 13 with the restricted opening 10 through the cylinder wall, and it also communicates with the respective controlling valve 8 that in turn communicates with the source of injecting pressure (not shown) through the pipe 15.

In operation the valves 8 are alternately opened by the rod 7 at the instant the piston groove 9 is in alinement with the respective openings 10—11 so that the oil that drips into the pipe 12 from the oil cup 14 (or other source of oil supply) will be blown into the cylinder through the respective port 10 and passed around the groove 9, the excess oil passing out through the port 11 and control valve 26 from whence it may be conveyed to any suitable reservoir. The valves 26 have stems 26ª that are engaged by the arms 7ᵇ of the rod 7.

Either two injectors and one piston groove may be employed, as shown in Fig. 1, or two piston grooves and a single injector may be employed, as shown in Fig. 3, or other modifications and combinations can be arranged, dependent upon the circumstances of the particular case.

When the invention is to be used to lubricate slide valves and the like, I prefer the arrangement indicated in Figs. 4 and 5, by reference to which it will be seen that the valve chest 16 has the usual ports 17—18 that are controlled by the valve 19 in the usual way. The valve chest has its valve contacting faces provided with one or more oil grooves 20—21 that respectively communicate with the inlets 22—23 and outlets 24—25, the oil being injected at stated intervals by an injector mechanism, such as is indicated in Fig. 6, the valve 8 being operated to open at proper intervals in any approved way, as for example, by a cam and rod, as in the form shown in Fig. 1. The oil is blown in or injected into the respective grooves 20—21 only when the valve 19 is over the same and the back check valve 13 prevents the internal pressures from "blowing" back through the injector when the grooves 20—21 (in the form shown in Figs. 4 and 5) or the ports 10 (in the form shown in Figs. 1 and 3) are opened. The exhaust ports 11 are also controlled by check valves 26 that are of the same general construction as the valves 8 and operate in unison with the respective valve 8.

From the foregoing, it will be noticed that the oiling is effected by positive injection under pressure separate and free from the working pressures within the engine cylinder or the valve chest, as the case may be, and the system affords a very convenient and positive method of lubricating parts that operate under high temperatures.

From the foregoing, taken in connection with the accompanying drawing, it is thought the complete construction, advantages and operation of my invention will be readily apparent to those skilled in the art, and I desire, however, to call attention to the fact that any carbon or residue in the groove or grooves will be blown out through the discharge ports with the excess lubricant.

What I claim is:—

1. In an engine lubricating system, the combination with the piston and cylinder, of a groove extending partly around the piston, an inlet port in the cylinder wall and an outlet port therein, and means for injecting a lubricant through said inlet port into and through said groove to flow out through said outlet port as said groove is brought into alinement with said port as the piston reaches the end of its stroke and its movement is changing direction.

2. In a lubricating system for engine pistons and the like, the combination with the piston and the cylinder, said piston having a groove extending partly around the same, said cylinder having an inlet and outlet port for coöperating with said groove, means including a check valve for admitting oil through said inlet port, other means including a check valve for controlling the discharge of oil from said outlet port, and a single valve operating device for operating both of said valves.

3. In a lubricating system for engine pistons and the like, the combination with the piston and the cylinder, said piston having a groove extending partly around the same, said cylinder having an inlet and an outlet port for coöperating with said groove, means including a check valve for admitting oil through said inlet port, other means including a check valve for controlling the discharge of oil from said outlet port, and means for operating said valves.

4. In a lubricating system for lubricating moving surfaces, one of said surfaces having a thread-like groove, means for admitting oil into one end of said groove, means for discharging oil from the other end of the said groove, a controlling valve in each of said means, and a single valve operating device for operating both of said valves to permit lubricant to be forced through said groove at intervals.

5. In a lubricating system for lubricating moving surfaces, one of said surfaces having a thread-like groove, means for admitting oil into one end of said groove, means for discharging oil from the other end of said groove, a controlling valve in each of said means, and means for operating said valves to permit the lubricant to be forced through said groove at intervals.

6. In a lubricating system for lubricating reciprocating contacting surfaces, one of which has a thread-like groove, means for forcing lubricant to fill and pass through said groove from end to end at the end of each reciprocation of said surfaces, during the time the direction of movement of the reciprocating part is changing and means for conveying excess lubricant from the discharge end of said groove.

WM. J. WRIGHT.

Witnesses:
  A. E. DIETERICH,
  GEO. B. PITTS.